United States Patent
Hong

(10) Patent No.: US 8,941,352 B2
(45) Date of Patent: Jan. 27, 2015

(54) APPARATUS FOR CONTACTLESS CHARGING OF MOBILE TERMINAL

(75) Inventor: Woong Sun Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 13/110,340

(22) Filed: May 18, 2011

(65) Prior Publication Data

US 2011/0285348 A1 Nov. 24, 2011

(30) Foreign Application Priority Data

May 19, 2010 (KR) ........................ 10-2010-0046839

(51) Int. Cl.
*H02J 7/00* (2006.01)
*H02J 7/02* (2006.01)
*H01F 5/00* (2006.01)

(52) U.S. Cl.
CPC ................ *H02J 7/025* (2013.01); *H01F 5/003* (2013.01)
USPC ........... 320/108; 320/107; 320/110; 320/111; 320/112

(58) Field of Classification Search
CPC ..................................................... Y02J 7/025
USPC ....................................................... 320/108
See application file for complete search history.

(56) References Cited

U.S. PATENT DOCUMENTS

| | | | | |
|---|---|---|---|---|
| 7,288,918 | B2* | 10/2007 | DiStefano | 320/108 |
| 8,183,827 | B2* | 5/2012 | Lyon | 320/108 |
| 2008/0111694 | A1* | 5/2008 | Yamagajo et al. | 340/572.7 |
| 2008/0164844 | A1* | 7/2008 | Kato et al. | 320/114 |
| 2009/0144972 | A1* | 6/2009 | Cheng et al. | 29/847 |
| 2011/0133998 | A1* | 6/2011 | Hobson et al. | 343/702 |

FOREIGN PATENT DOCUMENTS

JP 2006042519 A * 2/2006 ................ H02J 7/00

* cited by examiner

*Primary Examiner* — Edward Tso
*Assistant Examiner* — Ahmed Omar
(74) *Attorney, Agent, or Firm* — Jefferson IP Law, LLP

(57) ABSTRACT

A contactless charging apparatus of a portable terminal is provided. The contactless charging apparatus of a portable terminal includes a main circuit board, a rectifying unit, a charging unit, and a secondary coil unit mounted on the main circuit board for generating an electromotive force. The secondary coil unit may be formed on the main circuit board in a patterning process instead of an existing copper line coil. A coil layer formed in the patterning process generates an electromotive force induced by a magnetic induction field created by a contactless charger, and a direct current is applied to a battery to charge the battery using the rectifying unit and the charging unit.

7 Claims, 6 Drawing Sheets

APPARATUS FOR CONTACTLESS CHARGING OF MOBILE TERMINAL

PRIORITY

This application claims the benefit under 35 U.S.C. §119 (a) of a Korean patent application filed on May 19, 2010 in the Korean Intellectual Property Office and assigned Serial No. 10-2010-0046839, the entire disclosure of which is hereby incorporated by reference.

BACKGROUND OF THE INVENTION

1. Field of the Invention

The present invention relates to a contactless charging apparatus for a portable terminal. More particularly, the present invention relates to a contactless charging apparatus for a portable terminal that improves durability.

2. Description of the Related Art

A portable terminal is typically charged using a wired charging method. The wired charging method may be divided into a method that uses a USB type charger and a method that uses a holder type charger.

The USB type charger is directly inserted into a charging socket formed at one side of a portable terminal in order to charge the portable terminal.

On the other hand, the holder type charger charges the portable terminal by supplying current to a terminal included in the holder that is connected to a battery terminal of a portable terminal. The other end of the holder terminal is electrically connected to an external outlet.

However, the wired charging method may not properly charge the battery of a portable terminal due to a defective contact between the charger and the battery during the charging period, resulting in an undercharged battery and reduction of battery life.

To address the foregoing problems, a contactless charging method has been developed. The contactless charging method does not charge a portable terminal using a charger in a wired scheme. Rather, the contactless charging method includes a contactless charger and a contactless charging apparatus installed in a portable terminal.

In the contactless charging method, a secondary coil of a contactless charging apparatus that is installed in a portable terminal generates an electromotive force that is induced by a primary coil mounted in a contactless charger to charge a battery located in the portable terminal.

In recently developed contactless charging methods, a secondary coil of a contactless charging apparatus is mounted in a battery or is separately installed in an external contactless charging apparatus of the portable terminal.

In the case where the secondary coil is mounted in the battery, if the battery is lost, the user must but a new battery of the same type since a battery of another standard may not include a secondary coil mounted in the battery and thus may not be charged. However, because a secondary coil is mounted in the battery, the battery is expensive. Accordingly, if the battery reaches its end of life or if the battery is lost, a user must buy a battery with a secondary coil in order to power the portable terminal.

On the other hand, when the secondary coil is installed in a separate external contactless charging apparatus, a thickness of the portable terminal is increased due to a charging component. This results in an inconvenience to the user.

In addition, since secondary coils are wound by a copper line, they are more susceptible to electric shocks and may be easily circuit-shorted. In that case, the portable terminal cannot be charged.

SUMMARY OF THE INVENTION

An aspect of the present invention is to address at least the above-mentioned problems and/or disadvantages and to provide at least the advantages described below. Accordingly, an aspect of the present invention is to provide a contactless charging apparatus of a portable terminal in which a secondary coil thereof is directly installed on a main circuit board.

In accordance with an aspect of the present invention, a contactless charging apparatus of a portable terminal is provided. The apparatus includes a main circuit board, a rectifying unit, a charging unit, and a secondary coil unit mounted on the main circuit board for generating an electromotive force induced by the primary coil unit.

The secondary coil unit may include a coil layer having a circular form on a plane. The secondary coil unit may be formed on the main circuit board in a patterning process.

As described above, a secondary coil may be formed on a main circuit board in a patterning process to reduce a thickness of a portable terminal and increase the durability thereof.

Further, a contactless charging apparatus may be mounted in a portable terminal to reduce a manufacturing cost.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
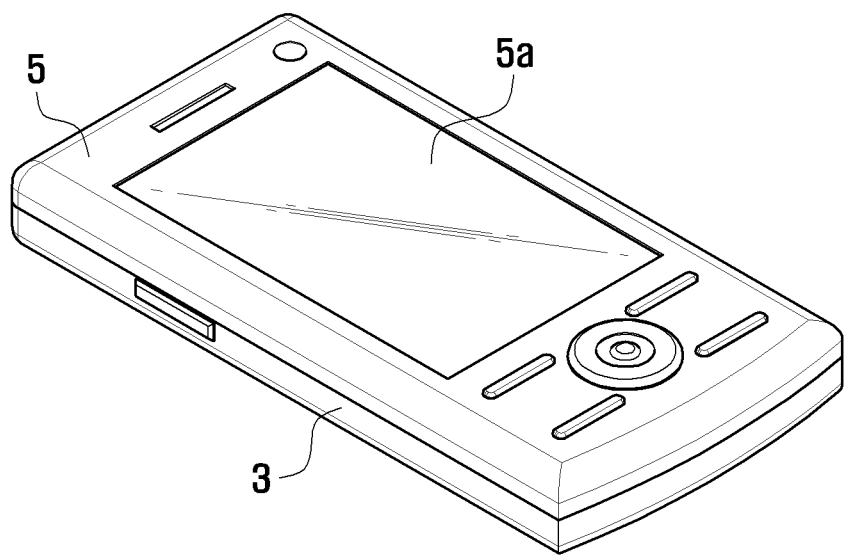
FIG. 1 is a perspective view illustrating a configuration of a portable terminal according to an exemplary embodiment of the present invention.

FIG. 1 is a perspective view illustrating a configuration of a portable terminal according to an exemplary embodiment of the present invention.

Referring to FIG. 1, a portable terminal 1 includes a body 3, a slide unit 5, and a Liquid Crystal Display (LCD) 5a coupled to the slide unit 5. It is to be understood that, although a slide type terminal is illustrated, exemplary embodiments of the present invention are equally applicable to other types of terminals such as a folder type terminal, and the like.

Figure 2:
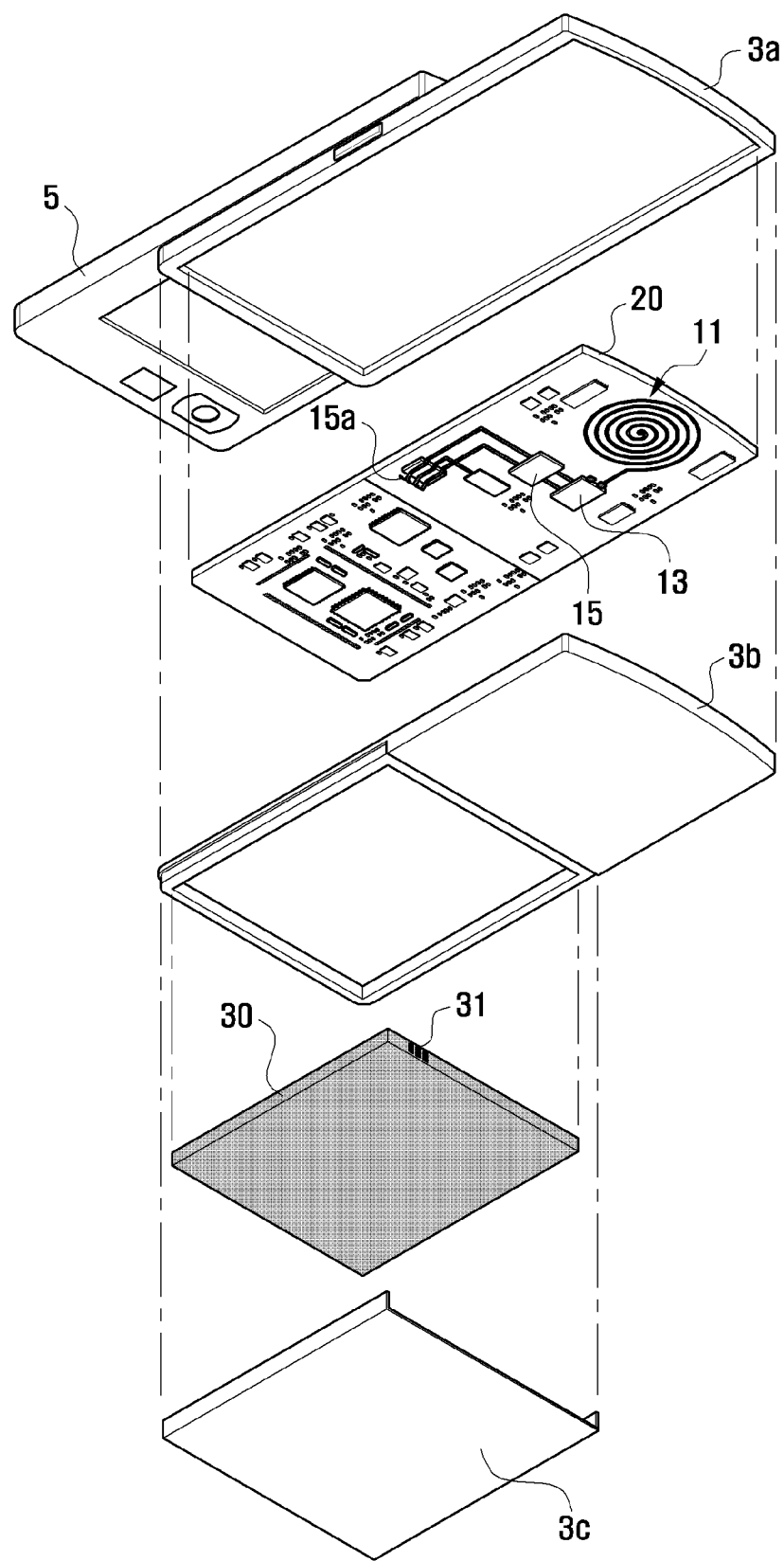
FIG. 2 is an exploded view illustrating a lower part of a portable terminal according to an exemplary embodiment of the present invention.

FIG. 2 is an exploded view illustrating a lower part of a portable terminal according to an exemplary embodiment of the present invention.

Referring to FIG. 2, the portable terminal includes an upper case 3a, a lower case 3b, a slide unit 5, a main circuit board 20, a battery 30, and a battery case 3c. The main circuit board 20 is disposed between the upper case 3a and the lower case 3b and includes a secondary coil 11, a rectifying unit 13, a charging unit 15, and a battery charging terminal 15a. The lower case 3b includes a recessed portion into which battery 30 may be placed. Moreover, the lower case 3b may include an opening that allows a battery terminal 31 to contact battery charging terminal 15a when the portable terminal is assembled and the battery 31 is installed. The battery case 3c is provided for coupling with the recessed portion of the lower case 3b so as to protect the battery and maintain the battery in the desired position.

The secondary coil unit 11 is formed at one surface of the main circuit board 20. The secondary coil unit 11 includes a coil layer spirally formed in a circular form on a plane.

In an exemplary implementation, the secondary coil unit 11 may be formed on the main circuit board 20 during a patterning process. More specifically, the secondary coil unit 11 may be formed during a patterning process, which may occur during the same patterning process used to form the semiconductor circuit wiring.

For example, the secondary coil unit 11 may be manufactured by sequentially performing a deposition process, a coating process, an exposure process, a development process, an etching process, and a peeling process. The deposition process forms an oxide layer (deposition layer) on a semiconductor substrate. The coating process coats the oxide layer with a photo-resist. The exposure process irradiates light (e.g., ultraviolet rays) on desired sections of the oxide layer to form a shape of the secondary coil unit 11. The development process selectively removes the photo-resist using a developing solution. The etching process removes an unnecessary oxide layer exposed by the photo-resist in the exposure process. The peeling process removes a photo-resist remaining on the oxide layer.

Since the foregoing exemplary embodiment is well known, a detailed description is omitted.

In an exemplary implementation, the patterning process of the coil layer is performed simultaneously with formation of a circuit wiring on the main circuit board 20. This reduces a manufacturing cost and a repetitive process.

Figure 3:
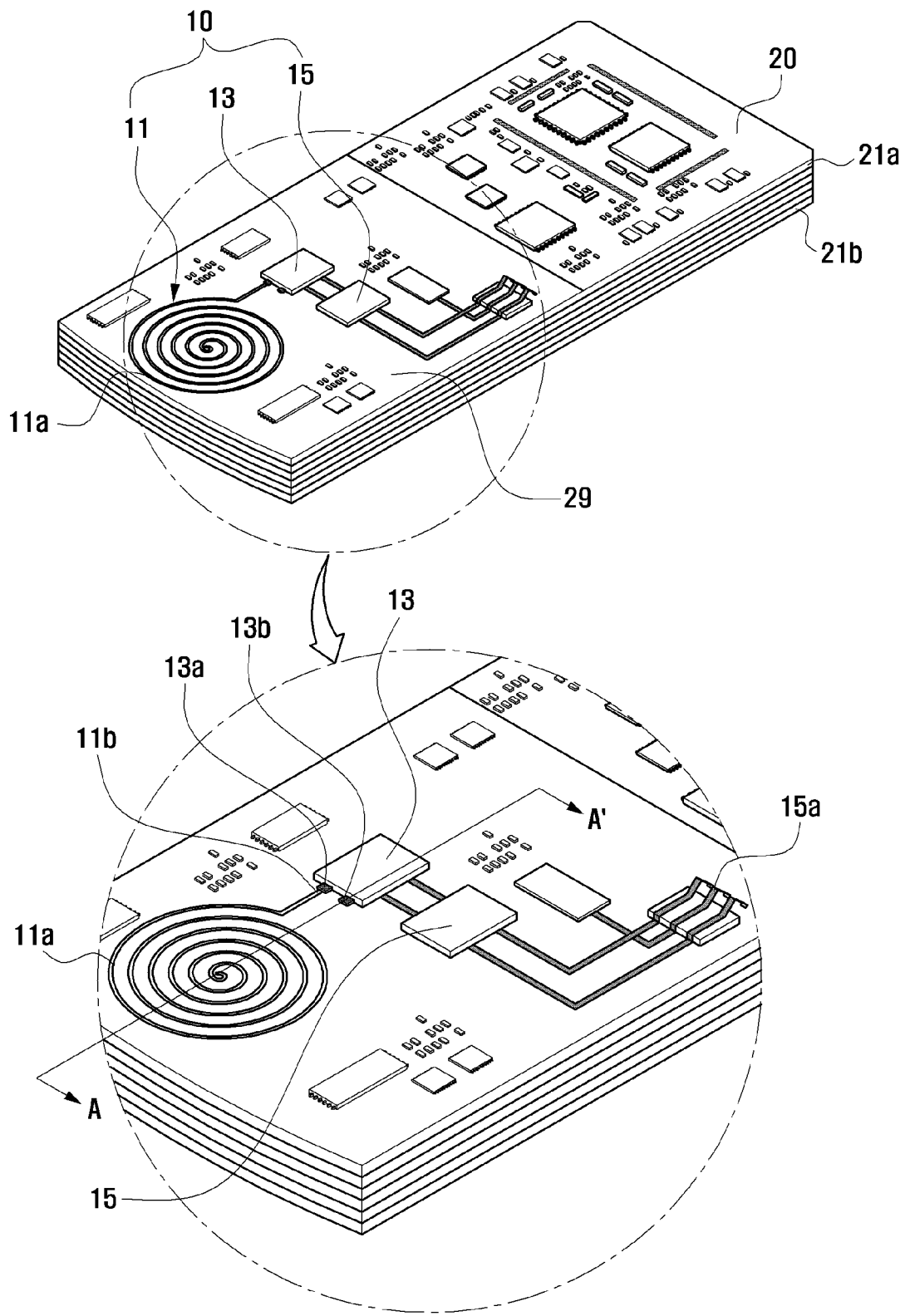
FIG. 3 is a perspective view illustrating a configuration of a contactless charging apparatus mounted on a main circuit board according to an exemplary embodiment of the present invention.

FIG. 3 is a perspective view illustrating a configuration of a contactless charging apparatus mounted on a main circuit board according to an exemplary embodiment of the present invention.

Referring to FIG. 3, a contactless charging apparatus 10 of the present invention includes a rectifying unit 13, a charging unit 15, and a secondary coil 11 formed on a main circuit board 20. In an exemplary implementation, the secondary coil may be formed during a patterning process to reduce a thickness and a manufacturing cost of the portable terminal, and to increase the durability of the portable terminal. The secondary coil 11 includes a coil layer 11a. Though illustrated having a circular form, this is merely for convenience and not limitation as the secondary coil unit 11 formed on the main circuit board 20 may have any polygon shape such as a circle, an ellipse, a hexagon, a square, and the like. The secondary coil unit 11 is made of a conductive material. As an example, a material of the secondary coil unit 11 on the main circuit board 20 may be the same as that of a conductive wiring and may be a conductive material to generate an induced electromotive force.

The main circuit board 20 has a multiple structure composed of a first outermost layer 21a, a second outermost layer 21b, and a plurality of inner layers disposed between the first and second outermost layers 21a and 21b. The first outermost layer 21a includes one or more semiconductor devices formed at an upper surface of the main circuit board 20. The second outermost layer 21b includes one or more semiconductor devices formed at a lower surface of the main circuit board 20. The secondary coil unit 11 may be formed at one of the first and second outermost layers 21a and 21b of the main circuit board 20. Furthermore, the plurality of inner layers include wirings formed between the first and second outermost layers 21a and 21b, and via holes connecting the wirings to each other. This will be illustrated in more detail with reference to FIG. 4.

The contactless charging apparatus 10 may be installed in a baseband block 29. In this case, the baseband block 29 is composed of logic circuits (not illustrated) to reduce electromagnetic interference with a radio frequency block composed of communication circuits on the main circuit board 20.

As illustrated in the expanded section of FIG. 3, secondary coil unit 11 includes a coil layer 11a having an end 11b that is electrically connected to one of two connecting terminals 13a and 13b of the rectifying unit 13. The rectifying unit 13 is composed of a diode and a capacitor, and rectifies an alternating current induced by the secondary coil unit 11 to a direct current using the diode and the capacitor. Further, the rectifying unit 13 connects with the charging unit 15 which includes a battery charging terminal 15a for contact with a battery. The rectifying unit 13 provides the direct current to a charging circuit (not shown) of the charging unit 15. When a battery is installed in the portable terminal, the charging unit 15 is electrically connected to the battery through the battery charging terminal 15a such that the rectified current provided to the charging unit 15 may be applied to the battery.

The coil layer 11a of the secondary coil unit 11 formed on the main circuit board 20 may have a polygon such as a circle, an ellipse, and a square.

Figure 4:
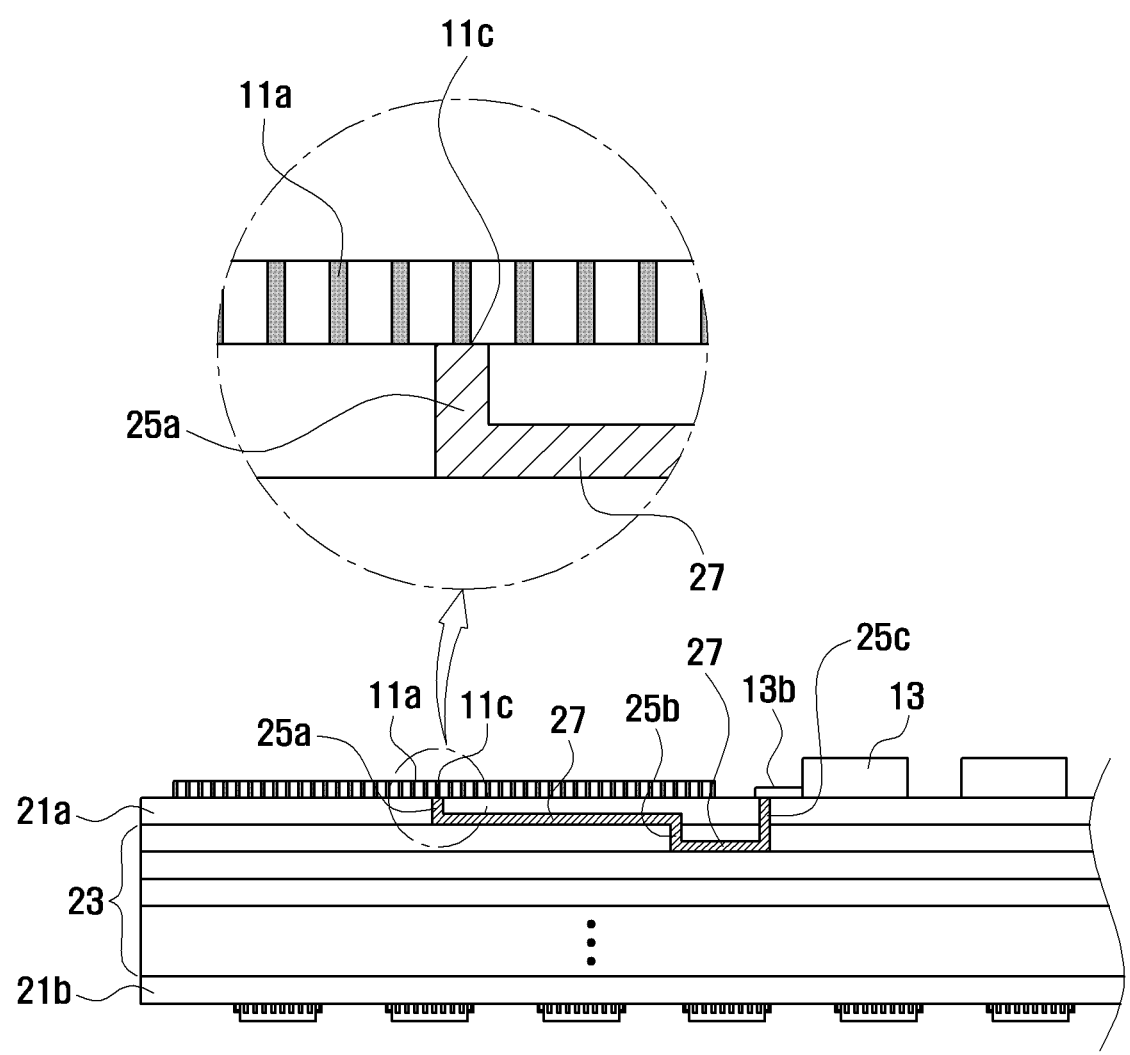
FIG. 4 is a sectional side view taken along line A-A' of FIG. 3 according to an exemplary embodiment of the present invention.

FIG. 4 is a sectional side view taken along line A-A' of FIG. 3 according to an exemplary embodiment of the present invention.

As shown in FIG. 4, connection between the secondary coil unit 11 and the rectifying unit 13 may be achieved through via holes 25a, 25b, and 25c and a wiring layer 27 formed on the main circuit board 20.

More specifically, an outermost end 11b of the coil layer 11a is electrically connected to connecting terminal 13a of the rectifying unit 13 at the outermost layer 21a of the main circuit board 20 on which the coil layer 11a is formed. This configuration is illustrated in FIG. 3.

Another end 11c, formed at a center of the coil layer 11a, is electrically connected to connecting terminal 13b of the rectifying unit 13. The end 11c of the coil layer 11a makes contact to the connecting terminal 13b through the wiring layer 27 formed in via holes 25a, 25b, and 25c, which are formed on inner layers 23 of the main circuit board 20. A via hole and a wiring layer may be formed via another inner layer according to a designed condition of the inner layers 23.

As an alternative, the rectifying unit 13 and the charging unit 15 may be provided on the second outermost layer 21b on a lower surface of the main circuit board 20. In this case, the rectifying unit 13 and the charging unit 15 may connect with the secondary coil unit 11 through one or more via holes and wiring layers formed in inner layers 23.

Figure 5:
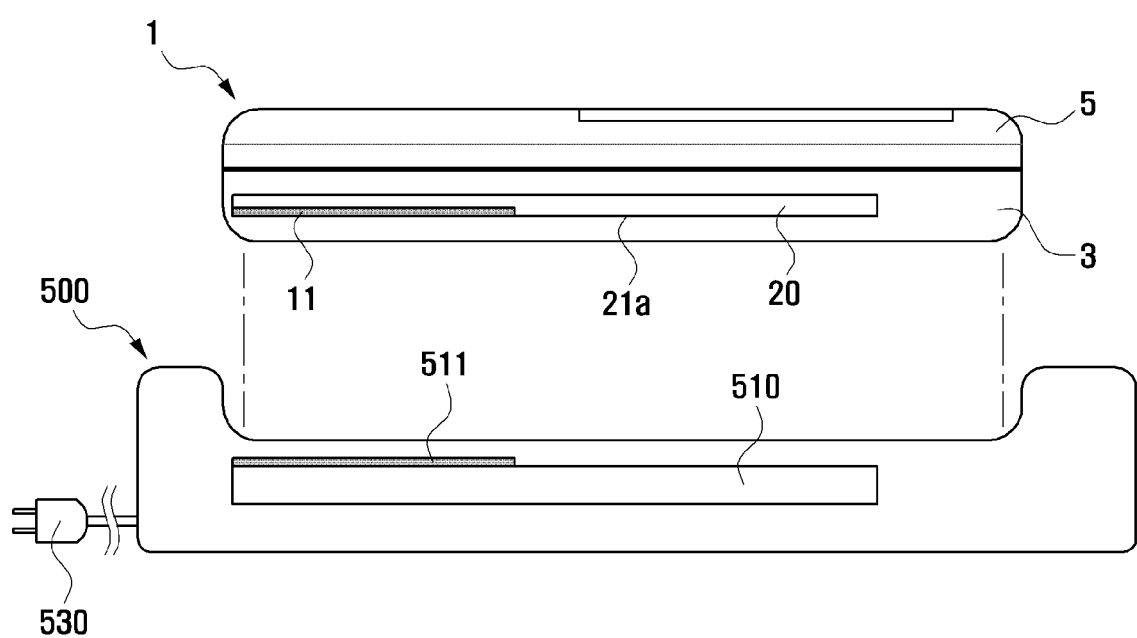
FIG. 5 is a fragmentary sectional side view illustrating a portable terminal with a contactless charger and a contactless charging apparatus engaging therewith according to an exemplary embodiment of the present invention.

FIG. 5 is a fragmentary sectional side view illustrating a portable terminal with a contactless charger and a contactless charging apparatus engaging therewith according to an exemplary embodiment of the present invention.

Referring to FIG. 5, a contactless charger 500 includes a power cord 530 and a power transmitter 510. In this case, the power cord 530 connects with an external power supply. The power transmitter 510 forms a magnetic induction field such that an induced electromotive force is generated in the secondary coil unit 11 of the portable terminal 1 inside the contactless charger 500 using the external power supply.

The power transmitter 510 includes a primary coil unit 511 similar to the secondary coil unit 11 of the portable terminal 1. That is, the induced electromotive force is generated in the secondary coil unit 11 of the portable terminal 1 by the magnetic induction field formed in the primary coil unit 511 of the power transmitter 510.

When the secondary coil unit 11 is formed at the first outermost layer 21a of an upper surface of the main circuit board 20, the main circuit board 20 may be disposed in a direction such that the first outermost layer 21a on which the secondary coil unit 11 is formed faces the contactless charger 500. Namely, the first outermost layer 21a of the main circuit board 20 on which the coil layer 11a is disposed is configured to face downwards toward an upper surface of the contactless charger 500. This is performed to easily receive a magnetic induction field and to minimize electromagnetic interference.

Figure 6:
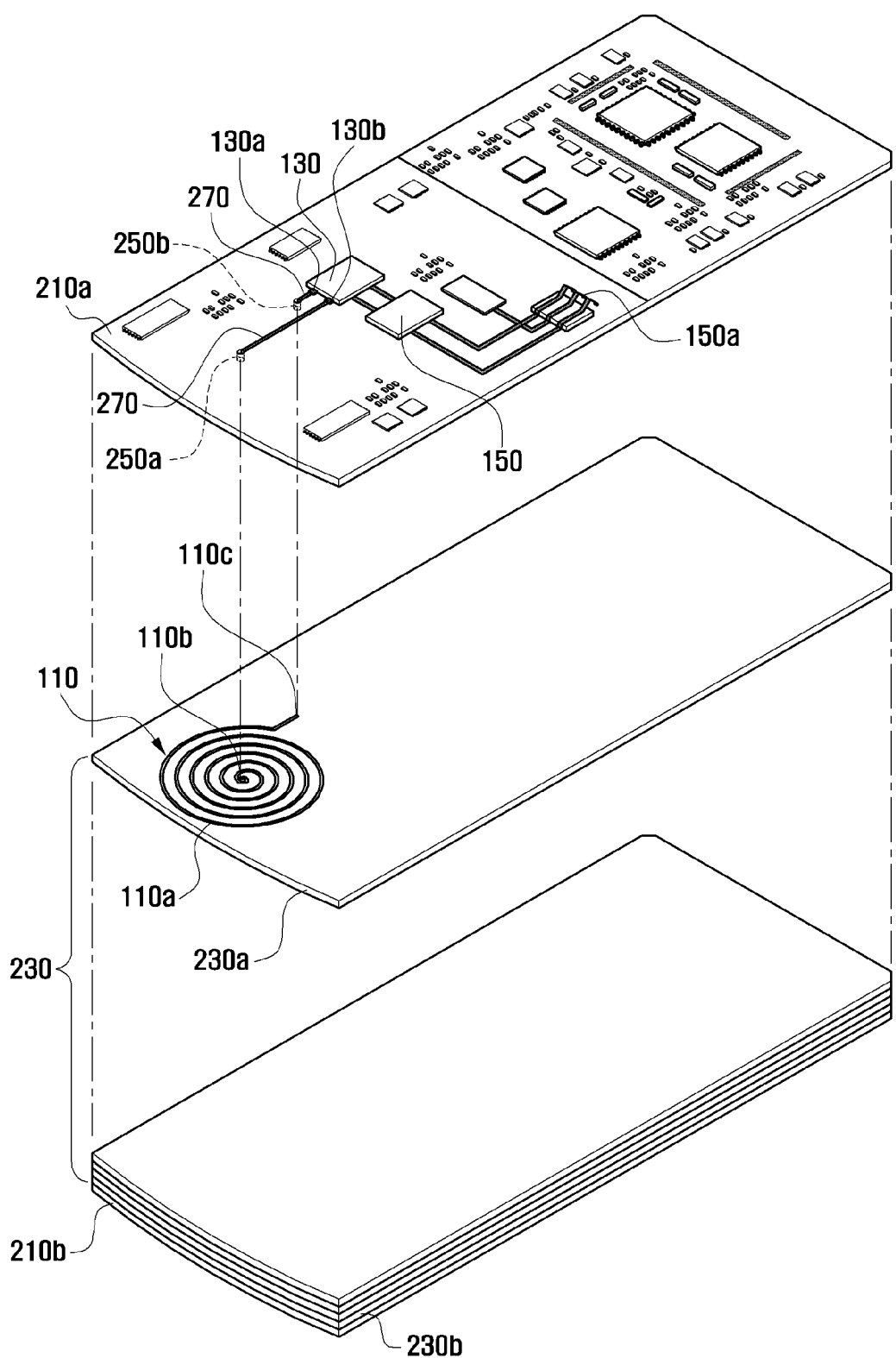
FIG. 6 is a perspective view illustrating a configuration of a contactless charging apparatus mounted on a main circuit board according to another exemplary embodiment of the present invention.

FIG. 6 is a perspective view illustrating a configuration of a contactless charging apparatus mounted on a main circuit board according to another exemplary embodiment of the present invention.

Referring to FIG. 6, a secondary coil unit 110 may be formed at one of inner layers 230 of a main circuit board 200.

The secondary coil unit 110 may be formed on an inner layer 230 in a case in which its formation on either of the outermost layers 210a and 210b of upper and lower surfaces of the main circuit board 200 would cause interference with a circuit element and/or a wiring. In that case, the secondary coil unit 110 may be formed using the inner layers 230.

As illustrated in FIG. 6, to increase efficiency of an induced electromotive force, the secondary coil unit 110 may be preferably formed at inner layers 230a and 230b under outermost layers 210a and 210b among the inner layers 230 of the main circuit board 200.

Namely, in a case of an outermost layer 210a of an upper surface of the outermost layers 210a and 210b, a secondary coil unit 110 including a coil layer 110a is formed at an inner layer 230a under the outermost layers 210a and 210b. In a case of an outermost layer 210b, the secondary coil unit 110 may be formed at an inner layer 230b under the outermost layers 210a and 210b.

Further, the secondary coil unit 110 is formed in substantially the same patterning process as that described above.

To connect the secondary coil unit 110 to a rectifying unit 130 formed at an outermost layer 210a, both ends 110b and 110c of the coil layer 110a may be electrically connected to connecting terminals 130a and 130b of the rectifying unit 130 formed at an outermost layer 210a of the main circuit board 200 through via holes 250a and 250b and a wiring layer 270, respectively.

Further, regarding a remaining connection and construction, namely, connection of the rectifying unit 130 and the charging unit 150 and connection of a battery charging terminal 150a connected to the charging unit 150 and a battery are substantially the same as those described above.

In the meantime, when the secondary coil unit 110 is formed at an inner layer 230a under the first outermost layer 210a of the main circuit board 200, the inner layer 230a is disposed facing an upper end of the contactless charger 500 as illustrated in FIG. 5.

The foregoing exemplary embodiments are equally applicable to a RIGID Flexible Printed Circuit Board (RIGID FPCB) connected to an LCD 5a of a slide unit 5 of the portable terminal 1.

As illustrated previously, coil units 11 and 110 may be formed on the main circuit boards 20 and 200 in a patterning process to improve durability against a shock short-circuit, respectively. Furthermore, coil unit 110 may be formed in any of the plurality of shapes and materials as described with regard to coil unit 11.

The above described exemplary embodiments of the present invention provide an apparatus that increases the convenience of a portable terminal to a user. More specifically, by excluding a separate external charging component, which may be eliminated by including coil units 11 and 110 in a portable terminal, it may remarkably reduce a thickness of the portable terminal.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A contactless charging apparatus of a portable terminal, the apparatus comprising:
   a main circuit board comprising a circuit wiring formed thereon through a patterning process;
   a rectifying unit formed at an outermost layer of the main circuit board;
   a charging unit formed at the outermost layer of the main circuit board and electrically connected to the rectifying unit; and a secondary coil unit configured to generate an electromotive force which is induced by a primary coil mounted in a contactless charger, and to be formed at an inner layer under the outermost layer among inner layers of the main circuit board through the patterning process and electrically connected to the rectifying unit through via holes and a wiring layer, wherein the secondary coil unit comprises a coil layer spirally formed on a portion of the main circuit board.

2. The apparatus of claim 1, wherein the secondary coil unit comprises a conductive material.

3. The apparatus of claim 1, wherein the secondary coil unit comprises a coil layer having a shape of at least one of a circle, an ellipse, a hexagon, and a square.

4. The apparatus of claim 3, wherein the secondary coil unit comprises a conductive material.

5. The apparatus of claim 1, wherein the secondary coil unit is formed on an inner layer of the main circuit board.

6. The apparatus of claim 5, wherein both ends of the secondary coil unit are electrically connected to a connecting terminal of the rectifying unit through the via holes and the wiring layer, respectively.

7. The apparatus of claim 1, wherein the contactless charging apparatus is provided in a baseband block to reduce electromagnetic interference with a Radio Frequency (RF) block on the main circuit board.

* * * * *